(12) United States Patent
Sharp

(10) Patent No.: US 8,092,223 B1
(45) Date of Patent: Jan. 10, 2012

(54) EDUCATIONAL, PERSONALIZABLE, MULTI-SENSORY LEARNING AID

(76) Inventor: Angela M. Sharp, Bainbridge Island, WA (US)

( * ) Notice: Subject to any disclaimer, the term of this patent is extended or adjusted under 35 U.S.C. 154(b) by 611 days.

(21) Appl. No.: 12/243,706

(22) Filed: Oct. 1, 2008

Related U.S. Application Data

(60) Provisional application No. 60/981,558, filed on Oct. 22, 2007.

(51) Int. Cl.
*G09B 11/00* (2006.01)
(52) U.S. Cl. .................................................. 434/162
(58) Field of Classification Search .................. 434/156, 434/159, 162–165, 167, 171, 178, 365, 416
See application file for complete search history.

(56) References Cited

U.S. PATENT DOCUMENTS

| | | | | |
|---|---|---|---|---|
| 3,512,273 | A * | 5/1970 | Baker, Jr. et al. | 434/163 |
| 4,669,986 | A * | 6/1987 | Yokoyama | 434/164 |
| 4,878,844 | A | 11/1989 | Gasper et al. | |
| 5,387,107 | A | 2/1995 | Gunter et al. | |
| 5,772,212 | A | 6/1998 | Hagedorn | |
| 5,788,503 | A * | 8/1998 | Shapiro et al. | 434/172 |
| 5,899,698 | A * | 5/1999 | Sandlin | 434/157 |
| 5,938,242 | A | 8/1999 | Ryan | |
| 6,302,696 | B1 * | 10/2001 | O'Neill | 434/162 |
| 6,544,037 | B2 | 4/2003 | Fink | |
| 6,629,845 | B2 * | 10/2003 | Zwiers | 434/171 |
| 6,669,478 | B2 | 12/2003 | Edwards et al. | |
| 6,884,082 | B1 * | 4/2005 | James | 434/408 |
| 7,052,278 | B2 | 5/2006 | Johnson et al. | |
| 7,104,798 | B2 | 9/2006 | Spaventa | |
| D583,416 | S * | 12/2008 | Cisneros | D19/59 |
| 7,717,713 | B2 * | 5/2010 | Wescott et al. | 434/162 |
| 7,819,433 | B2 * | 10/2010 | Schulken | 283/45 |
| 2002/0142271 | A1 | 10/2002 | Curtin | |
| 2004/0067470 | A1 | 4/2004 | Morris | |
| 2005/0282122 | A1 * | 12/2005 | Crawford | 434/159 |
| 2006/0040242 | A1 | 2/2006 | Mejia | |
| 2006/0188853 | A1 * | 8/2006 | Mismas | 434/162 |
| 2006/0194177 | A1 * | 8/2006 | Vaughan | 434/238 |
| 2007/0048693 | A1 | 3/2007 | Hannan | |

* cited by examiner

*Primary Examiner* — Kurt Fernstrom
(74) *Attorney, Agent, or Firm* — Jacques M. Dulin; Innovation Law Group, Ltd

(57) ABSTRACT

Learning aid device/method for children/adults/second-language-learners learning to read and write comprising a single or double-sided card depicting one or more words in upper and/or lower case displayed on ruled upper/lower case guidelines, and a corresponding real object image. The card includes ample space for a left or right-handed learner to copy/draw the word(s) depicted with erasable markers next to and/or below the word(s). The card is laminated (including a sealing margin) or coated, and is heavy-duty. The text may be textured, distinguishing it from the card's slick surface. When touching the text, learners gain finger/hand muscle training, assisting them in manipulating the writing instrument (marker). A key aspect of the inventive learning device is the provision of personalizable/interactive activity features, namely a slot at the edge of the image area where a picture personal to the user/learner may be inserted into a clear pocket viewable from the front of the card.

18 Claims, 9 Drawing Sheets

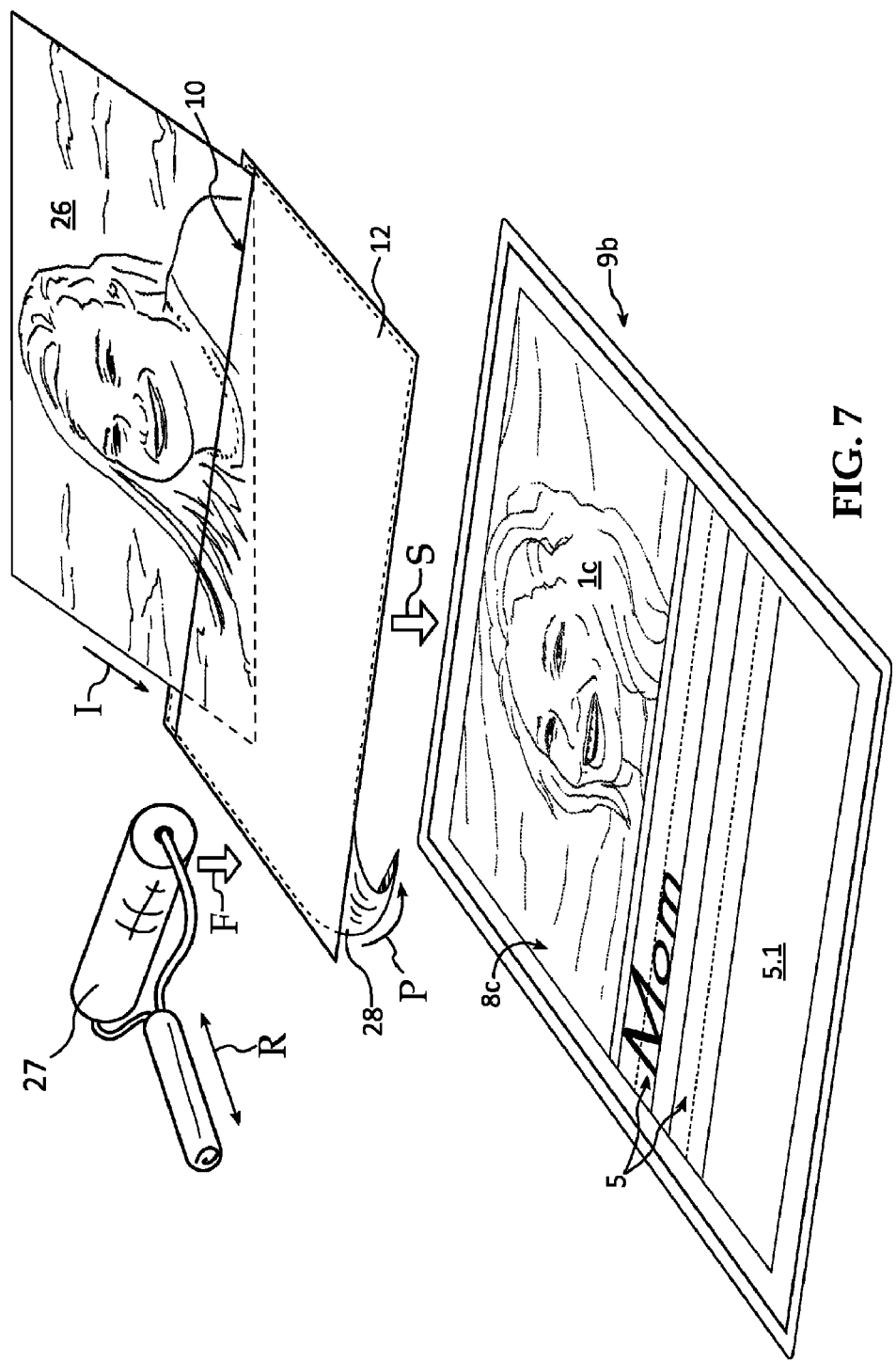

EDUCATIONAL, PERSONALIZABLE, MULTI-SENSORY LEARNING AID

CROSS-REFERENCE TO RELATED APPLICATION

This application is the regular U.S. Application of Provisional Application Ser. No. 60/981,558 filed by the same inventor under the same title on Oct. 22, 2007, the priority of which is claimed under 35 US Code Sections 119, 120ff.

FIELD

The invention relates generally to educational learning tools, more particularly to devices of the erasable flash card type that teach reading and writing to young children, featuring multiple, sensory and activity-based personal picture insert components. The inventive educational learning aid comprises a single or double-sided card depicting one or more words, in any selected language, in upper and/or lower case, displayed on a background of ruled guidelines to assist in distinguishing upper from lower case, and a section displaying a corresponding real image of an object identified by or having an attribute of the word(s). The card includes ample lined space for either a left or right-handed child to copy the word(s) depicted with erasable markers next to and/or below the word. The card also includes blank space for the child to draw the image, in addition to writing the word. The card material is paper encased in heavy duty laminating plastic covers on both sides, and includes a sealed peripheral margin. Alternatively, the card material is a heavy duty paper stock with a durable, write-on coating (e.g., a printer's varnish or plasticized layer) on one or both sides. A textured surface may overlie or border the word orthography to assist in tactile learning response of the child by a finger-trace method. The card device features a pocket formed between layers associated with the picture portion for the learning child to interactively insert a photo of the word object, thereby personalizing it for more permanent and relevant cognitive connection, which enhances learning. The blank space optionally can include signage images of letters spelling the word.

BACKGROUND

With the evolution of technology and more thorough research into how our brain connections develop and how we learn, researchers have drawn on information from brain scans, past research data, and new studies to help us better understand the most effective approaches to education.

As we learn more about learning styles and multiple intelligences, we have begun to realize that the "Text-based" learning approach that has dominated education since the late 1700s is, at the very least, inadequate to universally teach verbal and writing skills, especially to those of us who are right-brained, "Visual Learners". Indeed, the Text-based approach can be criticized as unfairly condemning visual learners as dummies, thereby relegating them to second class status, and denying them entry into colleges. For over a hundred years, dominantly visual learners have, at best, been shunted to trade schools, if not totally denied advanced educational opportunities. With the advent of TV and multimedia, we have begun to address the creation of educational learning tool devices that are better tailored to people having diverse educational needs.

Researchers have found that the development of children's language skills in particular is affected by multiple developmental stages and stimuli (Koralek & Collins 1997). In another study, it was discovered that young people who can understand the letter-to-sound relationship had much higher comprehension, word recognition and spelling (Adams 1990). In addition, scientists have found that children can more easily understand new concepts during play because their hands and minds are engaged at the same time (Bruner 1999, Wood & Bennett 1999). Based on this and other supporting research, it is becoming clear that a key to language development in children is to not only provide interesting, educationally-rich, reading and writing materials, but to present multi-sensory active learning opportunities that empower the children to flourish on multiple levels.

Because of the considerable amount of research into learning processes and styles, there have been many educational products developed to help people learn to read and write. Some products help teach phonics in a visual and tactile manner (e.g., Edwards U.S. Pat. No. 6,669,478). Others teach spelling and letter order using tactile movable letters (e.g., Miller U.S. Pat. No. 4,006,541). However, these are piecemeal, non-integrated approaches.

Although a number of inventions offer multi-sensory learning experiences, none have effectively provided a multi-sensory experience which is strong visually, kinesthetically/tactilely/physically, audibly, cognitively/language-wise, and emotionally/socially. For example, one commercially available flash card-based system comprises 4"×7" multi-layer cardboard cards having cartoon images associated with words that include finger-trace grooves formed by die cutting the outer layer of the card. All words are upper case only, there are no upper/lower case guidelines, and the writing area is small. The cardstock is only varnished, and therefore not robust. Nor are the cards capable of being personalized, that is, related to the learning child or his or her family. Finally, the illustrations are not real images; rather they are "politically correct" cartoon figures, for example, the "BOY" and "GIRL" are colored green, so as to not offend any race, creed, color, etc.

Accordingly, there is a need in the art for a learning tool that addresses the needs of both text and visual learners in the form of a multi-sensory, personalizable, learning experience that effectively teaches reading, writing, and word recognition to all learning styles via multiple developmental stages while providing a way in which the user's multiple and continued successes can be seen by others, thereby promoting self esteem and emotional development in children.

THE INVENTION

Summary, Including Objects and Advantages

The invention is directed to a learning "tool" apparatus (or device) and method for teaching reading, writing, and word recognition to young children utilizing personalizable tactile, kinesthetic, visual, and verbal features for faster, more universal cognitive development over a wide range of differing learning styles, intelligences, and developmental stages.

The inventive learning apparatus is a set of single or double-sided, large, flash-type cards, each of which depicts one or more native and/or foreign words in a first portion and a corresponding image in a second portion. Each card is constructed with a durable coating on both sides, the material of which may be written-on with markers and which permits the markings to be easily erased with paper towels, tissues, wet wipes or the like. The two, image and word, portions may be side by side in a rectangular or "landscape" card format, or one above the other in a generally square or "portrait" card format. The term "word" also refers to a character set.

An important feature of the inventive educational card device is that one or more cards in each set is image-personalizable, in that the card includes a pocket overlying the stock image laminated into the card, into which pocket the "learner" can insert an image, personal to the learner that represents the word/object that is the subject of the card. Thus, where a generic card supplied with the set shows a woman for the "Mom" or "Mother" word, the child can insert a picture of his or her own mother, thereby personalizing the card. Unexpectedly, it has been found that this personalizing activity significantly reinforces learning both kinesthetically and cognitively, the word-object association being reinforced. In actual practice, experience with the inventive cards show that the personalization feature accelerates learning, heightens the interest and motivation of the learner child to engage in the learning activities, and makes the word-image association more permanent.

In the preferred embodiment, the card is a laminate or coated stock comprising at least one inner sheet of paper material, printed on one or both sides. When laminated, it is laminated with heavy, clear, smooth laminate-grade plastic, typically on the order of 10-30 mils in thickness. When coated, it is coated with a heavy duty clear, smooth, non-permeable coating, such as a printing varnish or plastic film. The inner paper core is printed to define the upper and lower portions, and then laminated or coated. When laminated, the paper core is smaller in area than the laminate plastic to provide a plastic-to-plastic laminated marginal border, so that the paper is sealed around all edges for durability. This construction is robust, so that the card set can be carried and handled for a number of years for use by multiple learners in a class or family. The heavy laminate plastic or coating is easily cleanable, e.g., with antibacterial wet-wipes, so that the cards do not become vectors for spreading germs amongst a classroom or day care environment. By way of example only, a typical landscape format card measures 4-4.5" high and 11-12" long, and a typical portrait format card measures 5¼" to 9½" wide by 8" to 12" tall.

The cards are preferably provided in associated groups or themed sets, such as Animals, Pets, Family, Vehicles, Tools, Toys, Sports, School, and the like. The laminated or coated cards have rounded corners so that no sharp corners can injure the child. The cards may be provided with an enlarged margin along one edge and one or more holes punched therein for hanging up the group of cards, or for storage in a multi-ring binder. The hole may be a relatively large oval, in which case it forms a handle for ease of carrying or handling as a group. The handle also helps orient the cards for storage or presentation.

The word portion of the card below the picture image includes guidelines to assist in distinguishing upper and lower case. In addition, this lower word portion is designed to be "handed neutral". That is, the card is universally and equally useable by both left and right-handed learners, with the indicia forming the word being placed in such a way that the hand/arm of the learner does not cover any portion of the word as the learner practices copying the word in the process of learning to write. In a preferred embodiment, the writing area is below the word, and large enough for the learner to both practice cursive writing or printing the word, and using it in a short sentence or drawing a picture.

The image portion of the card includes a real image (photo, picture or drawing) that represents the object identified or "named" by the word. The image is a real representation of the word object, and is herein termed a "real object image" to distinguish it from a cartoon. Cartoons pose a serious learning barrier, in that they are doubly inductive. That is, the learner must first use inductive reasoning to go from the specific to the general, and then take a second step to cognitively create a class of the objects that includes a cartoon schematic. Thus, a cartoon pig requires the learner to use induction to go from the concept of associating the letter indicia p-i-g with "a pig" as a real thing, and then imagine a class of "all real pigs" that includes the schematic "cartoon (unreal) pig".

In significant contrast, in the instant invention, the letter indicia p-i-g are associated with a real object image, namely a real pig. To introduce the concept of a class or group, the letter indicia provided are p-i-g-s, and the real object image is a photo of a group of pigs, say of same or different colors and markings. The leap to cartoon depictions may be addressed in a later developmental stage by deductive reasoning from the class of "all pigs" to the schematic cartoon.

With respect to the significant personalization feature of the inventive cards, to help strengthen the visual associative real object image component, the preferred embodiments of the inventive card devices include a slot providing access to a pocket or envelope in at least a portion of the upper image area between the laminate layers in at least some of the cards of the set, which pocket or envelope has a transparent outer layer so a photo is visible therethrough. In the alternative, a transparent pocket or envelope can be laminated or adhered to the outer layer of selected card(s). A teacher/learner-selected image, e.g., a photo, can be inserted into the slot into the upper area to function as the image associated with the word indicia. Thus, the upper image area may initially contain no image, or may contain a pre-selected or "standard" image provided as part of the card set. In either case, the slot-accessible pouch permits the user (teacher, parent, sitter or learner(s)) to insert a piece of paper containing an image in substitution for, and to cover up, a standard image.

Thus, the accessible pouch overlying the image area permits personalizing at least some of the cards in the set. This personalizable feature of the inventive card set greatly strengthens the word indicia-image association, significantly accelerating the learning process. In addition, it provides an activity for the learner: to cut out pictures the learner finds interesting or meaningful, and inserting them into the appropriate slots.

In one embodiment of the invention, the card set is accompanied by one or more workbooks, which may be provided initially as part of the set kit. Or the workbooks may be provided on a subscription basis, or on a selective purchase basis at a later time. In the workbook embodiment, the images may be defined with micro-perf borders so that the young learner may easily remove them from the page of the booklet for insertion in the pouches of the relevant inventive flash-type cards.

The layout of the card is simple and the text and image are depicted in relatively close proximity in order to help create a single visual impression in the user's mind. The actual text and images are not the same on all cards, thereby providing variety, increased interest, and the ability to provide multiple difficulty levels.

In a second, preferred embodiment, the word indicia has a tactilely differentiating surface for learning reinforcement. For example, the exterior surface of the laminate may be textured, differentiating it from the remaining smooth surface of the card, thereby enabling the learner to finger-trace the word or words, providing a tactile sensory experience in addition to the visual experience. The tactile differentiation may be continuous along the indicia, or intermittent, and may be directionally oriented or progressive, to assist in conceptualizing cursive writing skills. For example, the core paper and/or finished card may be embossed or debossed, so that the card's surface is raised or recessed in the area of or around the indicia. In an alternate embodiment, the surface of the laminated/coated outer layer over the indicia may be abraded or textured. Conversely, an area around the indicia may be abraded or textured, but the indicia area left smooth for a smooth finger trace path. That is, the texturing may be reversed-out, either to overlie the indicia or border it.

In still another alternative, the core paper itself may be multi-layer, with a die-cutout overlying the core sheet on which indicia are printed. Then, upon laminating or coating, a groove is formed as the finger-trace path for the tactile experience. The path can be of varying or progressively changing width to indicate direction of movement of the finger, and to distinguish main elements of the indicia from secondary elements, if any.

The card's surface is impermeable, allowing the user to write on the card with an erasable writing instrument, then wipe clean.

The method of use of the inventive card set combines multiple sensory inputs to allow for the brain to learn effectively. First, the learner/user visually sees the text and the corresponding real object image, thereby creating a mental, text/visual association. Then the learner/user audibly says the word while looking at the text or repeats the word spoken by the teacher, making an additional auditory association. The learner/user then traces the textured indicia with his or her finger while at the same time audibly expressing the individual sounds of the letters and/or character(s), adding a kinesthetic association. If the text is a number, the user counts the objects depicted in the image instead of, or in addition to, sounding out the word. He or she then looks at the indicia (text) and says it in its entirety again. Lastly, he or she uses an erasable writing instrument to write the indicia independently on the empty ruled guidelines (and/or to finger or instrument-trace over the indicia). The card can then be wiped clean and the process repeated.

The inventive personalizable cards and method of use in language and writing education are appropriate for people of all ages, particularly children, learning to read and write native and second or foreign languages. Indeed, the cards may be used by children and adults wishing to learn a second language. In addition to cards having a single, selected language, such as English, Spanish, Chinese, etc., the cards can be bi-lingual, having text in both the first language of the learner and the target, second language. As a subset of bi-lingual cards, the cards can feature sign language images of the finger and hand positions for each letter of the text word, so that a speaker can learn sign language, or a deaf person/child can learn the hand signs for the objects depicted in the images.

In the preferred embodiment, and as a unique feature, one or more of the cards in the set has an insert slot associated with a pouch over the image area so that the parent, teacher, sitter or child can insert a picture associated with the word. Thus, for the word "Mom" or "Dad", the parent or child can insert a photograph of his/her mother/father, thus personalizing the card. For double-sided cards having a slot, the slot can be provided with a septum, on each side of which is a generic image of the word on the respective side of the card, so that there is an individual pocket for each side of the card. In the alternative, the card can function as a test card. That is, it need not have an image showing on one or both sides, the septum may be made of blank opaque paper, e.g., white paper, so that the learning child must select the correct image to insert in the pouch for that side of the card in order to match the word on the card.

In an alternate "testing" method, the teacher is instructed to insert an opaque piece of paper in the pouch to cover the image, hands the card to the learning child, and lets the child select and insert a matching personal picture. Or, the teacher can test the child's comprehension of the text only by covering the image with a blank piece of opaque paper, and having the child say the word on the card. The child can then match the word with a child-selected and inserted photo/picture, or by withdrawing the blank sheet of paper to reveal the object image. This way the teacher can determine that the child is learning the text association with the spoken word, and then to the object image.

In accordance with the device and method of the invention the learner is provided an activity by which the learner actively participates in personalizing the cards by cutting out pictures from magazines of an image of the real object identified by the word on the card. The child uses inductive reasoning to recognize and associate the picture of an object, e.g., a cat, a dog, a drum, etc., in a magazine, or supplementary material provided with the card (a workbook). The child then actively manipulates scissors to cut out the picture, and insert it into the card picture area via the edge slot. In an alternative, an activity booklet having images separated from the page by micro-perfs can be provided. The child merely searches the images for the one corresponding to the word(s) on the card, separates it from the sheet, and inserts it in the picture area of the card via the slot. For images from magazines or other non-perforated sources, the teacher/parent can assist the child in use of scissors, if the child has not progressed enough to use them solo.

The slot and pocket, provided to permit insertion of a picture into the internal, picture-retaining pocket of the card also functions to assist in image orientation learning. Thus, in the inventive learning device, the picture must be oriented correctly, that is, image facing outward, to be visible by the child. If the child inserts the picture the wrong way, e.g., back side of a picture of Mom facing out, it will just be a blank white area, and the picture of Mom will not be seen by the child. If the picture is inserted upside down, the incorrect orientation will be immediately apparent. Either result, a blank or an upside-down Mom image, leads to a perceptual learning moment, as the child will realize (or be shown by the teacher/parent) that the picture needs to be reversed or inverted in order to be visible through the pocket "window".

As an optional card structure, a thin sheet of plastic may be provided to cover the inside of the "window" area of the card, so that in the manufacturing of the card, the window area of the two facing "adhesive surface" faces or sides of the outer laminate sheets do not stick together so that an integral pouch is provided. This is an alternate to the presently preferred, best mode embodiment in which the pouch is provided as a stick-on pouch.

The inventive learning card is thus an activity card, as well as providing association with real objects, provides upper and lower case guidelines, provides optional tactile writing guides, is large enough for ease of manipulation, provides area for left and right-handed children to write on, and has an extended writing area both beside the word and below for sentences or pictures drawn by the child. In the educational learning device system of the invention, a series of workbooks can be provided having progressive images or real objects that can be separated (by use of micro-perfs) or cut out with scissors, as a guided developmental tool.

Although many inventions offer multi-sensory learning experiences, none have achieved the goal of offering a multi-sensory experience which is strong visually, kinesthetically, tactilely, audibly, cognitively/language-wise, and emotionally/socially, as in the case of the inventive learning card device, which thereby is universal as to addressing the needs of the many different learning styles or types, as follows:

Visual—This invention utilizes a simple layout that consists of a single word or concept paired with a single image or spatially-close group of related images in order to create a clear visual association impression for the user—an impression that can be efficiently learned and recalled by visual learners.

Kinesthetic/Tactile/Physical—The textured text creates added interest for kinesthetic learners, and the process of tracing each letter or character with his or her finger links what is on the card directly to the brain neurons. In addition, the act of independently writing the word or/and inserting a personal image reinforces the learning target while allowing the user to actively explore the word.

Audible—Looking at the word and image pair (also called a "couple") while audibly pronouncing the word makes an imprint on audible learners using the cards in their native languages. These audible learners are further benefited when the word is sounded out letter by letter, then recited in whole again.

Cognitive/Language—Sounding out the letters on cards in their native languages helps cognitive learners see how words are formed and the roles letters play in language. Seeing the image paired with the text on the card without distractions clearly displays the interrelationship between the object and text, and allows the user to interact with the word.

Emotion/Social—Healthy emotional and social development in children lead to a solid sense of identity and a good self esteem. What some multi-sensory reading and writing products lack is a way in which a child can display his or her progress to others. This invention empowers children to share and display every step of their progress since it is not mandatory to erase or reset the learning tool to move on. The praise children receive from peers and caregivers in the personalization activities of selecting, cutting out and matching/inserting pictures in the pouches, allow the learning children to take pride in their work, thereby significantly boosting self-esteem. Additionally, depending upon the child's personality, some will take the process one step further and naturally engage in teaching their peers by showing/telling other children the simple concepts on the card, furthering their social relationships and social development.

All Learning Styles—All users benefit from the varied sensory and emotional experiences available from this invention, especially children whose learning style or type might not be known and/or whose development is dynamic (Koralek & Collins 1997). Indeed, different children may progress through different styles of learning at different rates, so that the inventive card set, in having all the various functionalities addressing the different styles, is universal as to learning types. All learning styles gain phonemic awareness and learn word rules though the method's auditory process. By visually observing the text element on each card, users of all learning styles familiarize themselves with what the written language looks like. For young children using the cards, the act of tracing the letters helps develop fine muscle motor function, preparing them for success in writing the words independently. When these cards are used as tools for learning foreign languages, one becomes familiar with the words, letter combinations, and/or symbols used and begins to learn the commonalities and traits of the language.

BRIEF DESCRIPTION OF THE DRAWINGS

The invention is described in more detail with reference to the photographs, in which:

FIG. 7 is an exploded isometric showing the steps of adding a stick-on pocket to the face of a card followed by inserting a personalized photo of the child's Mom;

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
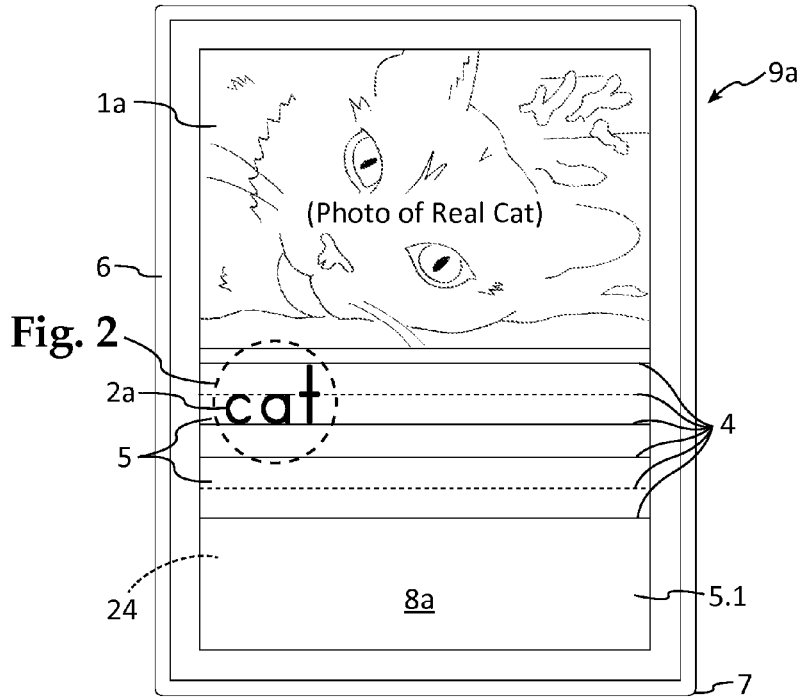
FIG. 1 is a plan view of a portrait-format card showing the first image area on the top, indicia spelling Cat in the center and the second, writing/drawing area to the right and below the indicia, this being the "Cat" side of a card in a themed series of Animal cards.

FIG. 1 is a plan view of the inventive card, in a first, portrait format 9a, showing an image area 1a in the upper portion, approximately ⅓ to ½ the area, indicia 2a spelling the word "cat" in the top left side of a second, writing area 5. The writing area 5 in this format is on the right and below the text "cat", and amounts to about ¼ to ½ the area of the card. FIG. 1 shows the "Cat" side 8a of a card 9a, in a themed series of Animal cards.

The optional drawing area 5.1 is located below writing area 5. The clear margin 6 has rounded corners 7 and the writing area 5 includes one or more solid and dashed or dotted lines and/or colored rows to define writing areas from non-writing areas, to function as upper and lower case letter-height guides 4. For example, the optional, non-writing, drawing areas may be light blue, green (or other color) or grey. The writing area may be white, the upper and lower writing lines solid, and the mid-line (the line of the top of the lower case letters) dashed or dotted. Alternately, the upper case portion of the writing lines 5 may be tinted while the lower case portion of the writing lines may be white, or vice versa. The texturing 3 of the indicia is best seen in FIG. 2.

Figure 2:
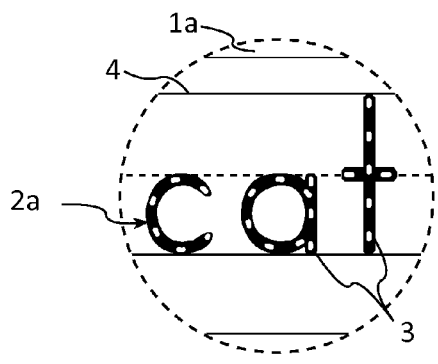
FIG. 2 is an enlarged view of the Cat indicia of FIG. 1 showing the spaced or dashed texturing of the tactile feature.
Figure 3:
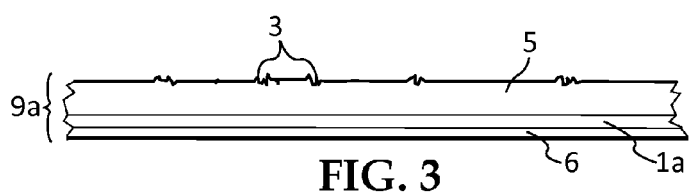
FIG. 3 is an enlarged view of the texturing from an angle showing the raised and spaced nature of the abrasions.

FIG. 2 is an enlarged view of the "Cat" indicia portion 2 of FIG. 1 showing the spaced or dashed texturing 3 of the tactile feature. FIG. 3 is an enlarged view of the texturing 3 of FIG. 2 from an angle, showing the raised and spaced nature of the abrasions 3.

Figure 4:
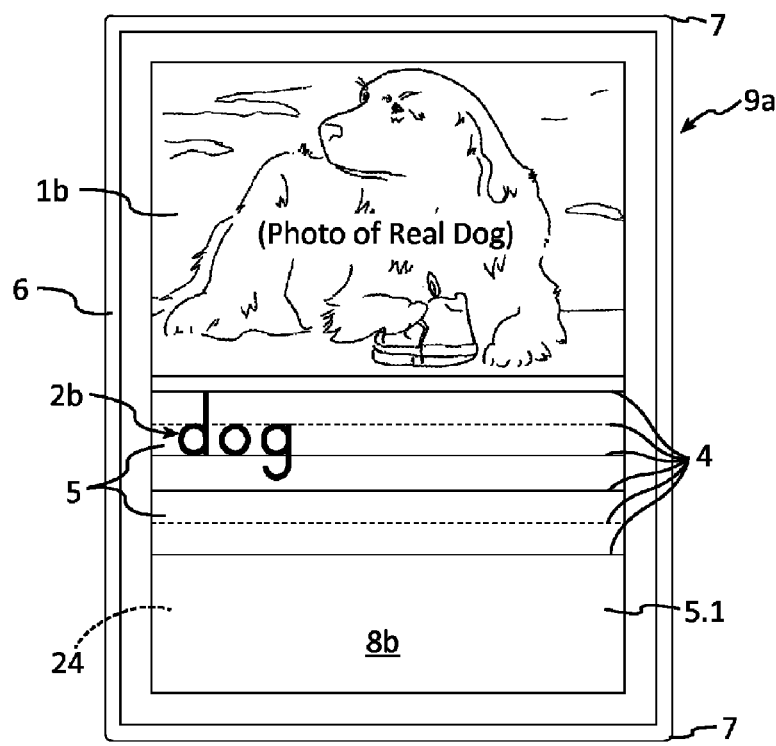
FIG. 4 is a plan view of the reverse side of the animal card of FIG. 1, in this case the "Dog" side of the card, showing that the cards advantageously may be two-sided.

FIG. 4 is a plan view of the reverse side of the Animal series card embodiment 9a of FIG. 1, in this case a "Dog" photo 1b in the image area, this side of the card being called the "Dog" side 8b of the card. This illustrates that the cards advantageously can be two-sided. The indicia 2b forms the word "Dog" to the left and upper side of the writing area 5. The clear margin 6 and rounded corners 7 are also visible.

Figure 5:
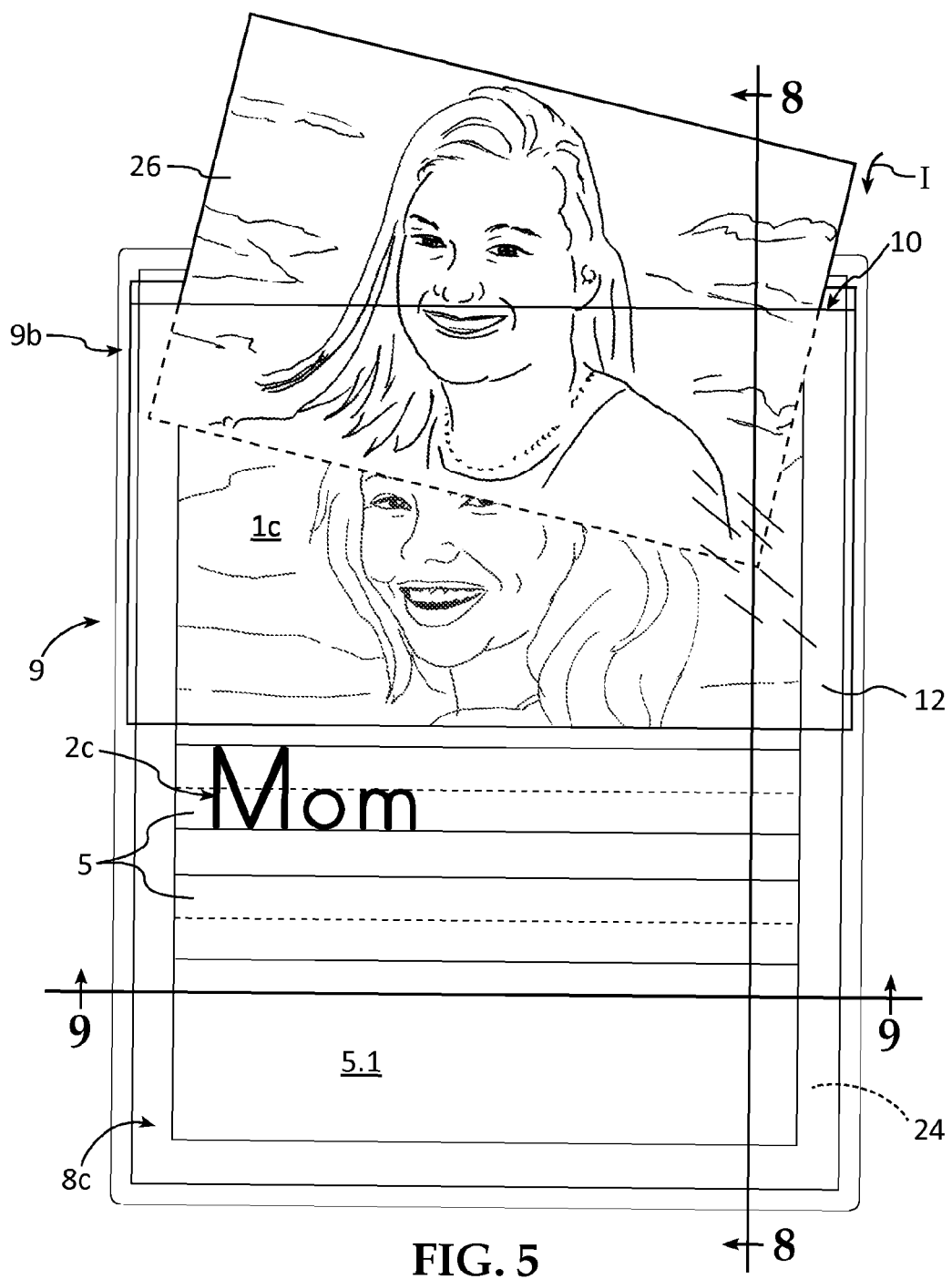
FIG. 5 is a plan view of a personalizable activity card, in this case a parents or family card having an upper slot into which a photo of the learner's mother can be inserted on the "Mom" side of the card.

FIG. 5 is a plan view of a second, personalizable embodiment 9b of an inventive learning card having a personal activity feature. In this second embodiment, a parents or family card having an upper slot 10 into which a personalized image 26, here a photo of the learner's Mother, can be inserted, as shown by the Arrow I, into the envelope or pocket 12 on the "Mom" side 8c of the card 9b. The personal photo thereby takes the place of, and covers, the generic photo 1c of the woman as shown in the image area of the printed sheet 24 that is laminated between the plastic bottom and top cover sheets 20, 22 (see FIGS. 8 & 9). The "Mom" indicia 2c is positioned in the writing area 5 to form the "Mom" side 8c of this activity-implemented embodiment of the inventive learning card.

Figure 6:
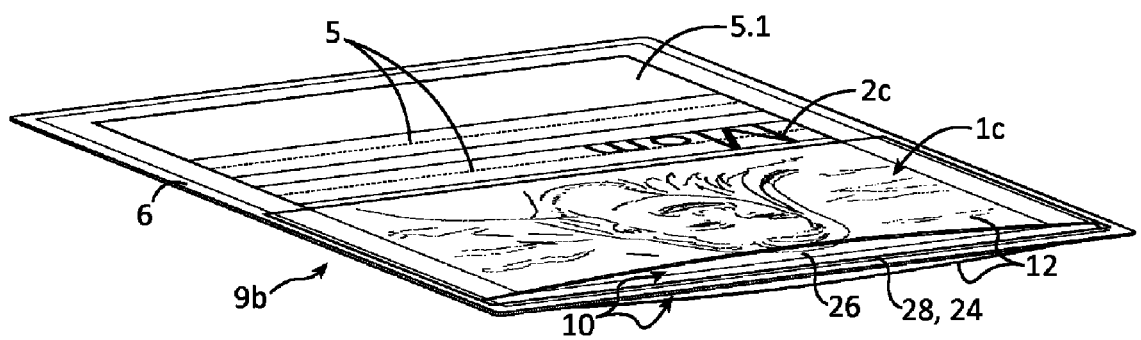
FIG. 6 is an isometric view from the top of the card showing the slot and separator sheet that provides two pockets, one for the Mom side and one for the Dad side of the family card in the image area.

FIG. 6 is an isometric close up of the second embodiment card of FIG. 5 showing the slot 10 for access into stick-on pockets 12, one each for the Mom side 8c and one for the Dad side 8d (see FIG. 10), respectively, of the second embodiment, family activity card 9b after full insertion of the personal photo of Mom, which is now visible in image area 1c. As seen in FIGS. 5 & 7, pocket(s) 12 have been applied over the image area. As shown, the backing sheet of the stick-on pocket is identified as element 28. However, it should be understood that the pocket 12 can be integral to the card, wherein the printed sheet 24 that is laminated between the cover sheets 20, 22 (see FIGS. 8 & 9), has the image area varnished or covered with a thin plastic sheet, so that when the cover sheet 22 is cut to form slit 10, an integral pocket is formed.

FIG. 7 is an isometric exploded view of the second embodiment of the inventive card 9b. These personalizable cards can be provided preassembled, or provided as a non-pocket version with a packet of stick-on pocket(s) 12, which are then applied, by the teacher, parent or person learning, to the appropriate cards desired to be personalized. The stick-on pocket 12 includes a removable backing sheet 28 that is peeled off as shown by Arrow P. Then the pocket is placed carefully over the image area 1c as shown by the Arrow S. Optionally, a roller 27 may be used to roll out any bubbles as shown by the Arrow R for the rolling motion, and Arrow F to show the application of pressure force on the pouch as adhered to the surface of the card 9b. Finally, Arrow I shows the insertion of the photo of the child's Mother 26 into the pouch via slot 10, so that the card is now personalized with the Mom's photo 26 in place of the generic image of a woman 1c.

Figure 8:
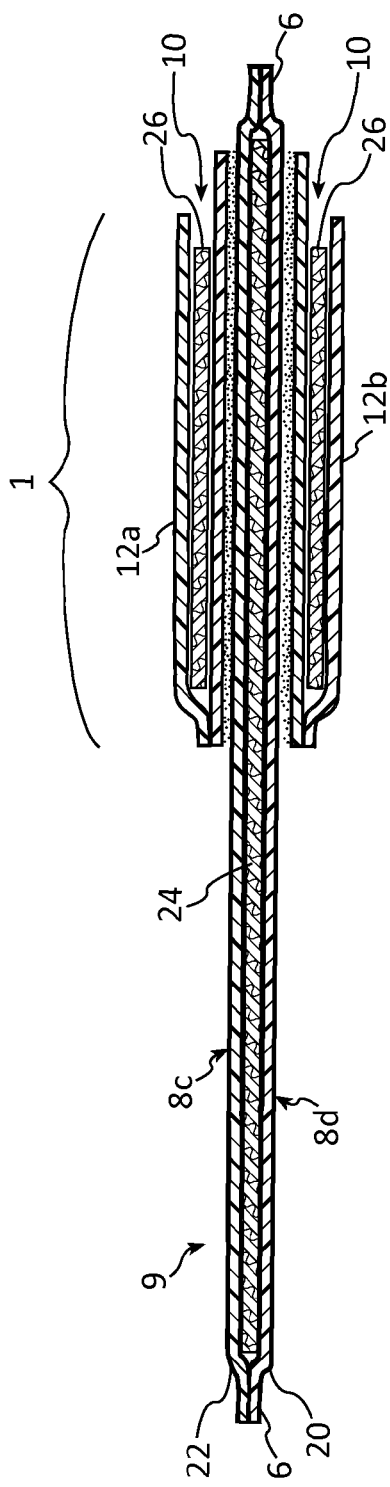
FIG. 8 is a section view along the line 8-8 of FIG. 5 showing pockets stuck on over the image areas of both sides of the inventive card.
Figure 9:
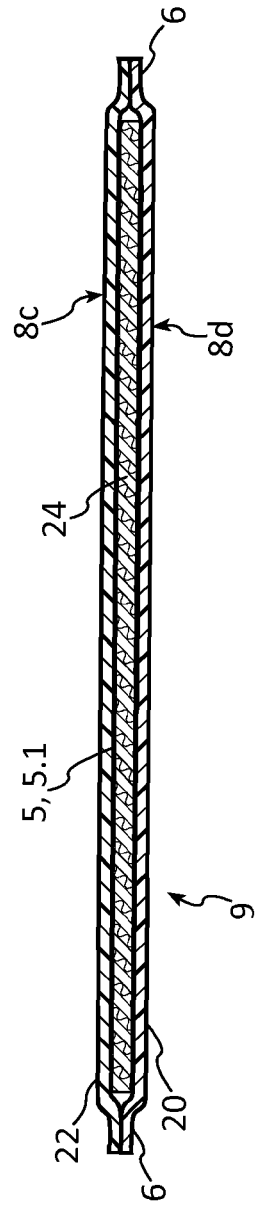
FIG. 9 is a section view along line 9-9 of FIG. 5 showing the internal structure of the laminated card.

FIG. 8 shows the card 9 from the long edge. FIG. 9 shows the card 9 from the short edge; together FIGS. 8 and 9 show that the card is thin in cross-section and edge-on aspect. In FIG. 8, stick on pouches 12a and 12b have been applied to, and adhere to, the top and bottom surfaces of the laminate sheets 22 and 20, respectively. The adhesive is shown by stippling. The result is personalizable pockets for the Mom side of the card 8c and the Dad side of the card 8d. These sheets of plastic 20, 22, effectively laminate and adhere to the inner printed sheet 24, which carries the image area 1, the lined writing area 5, and the drawing area 5.1.

Figure 10:
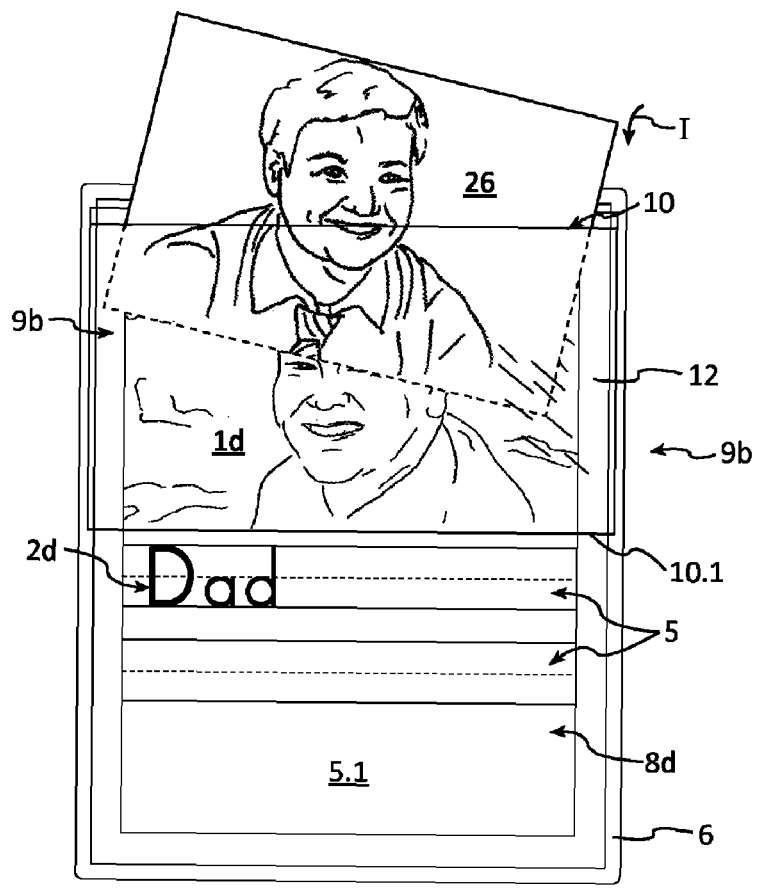
FIG. 10 is a plan view of the back side of the inventive activity card of FIG. 5, in this case the "Dad" side of the family card.

FIG. 10 is a plan view of the back side of the activity card 9b of FIG. 5, in this case the "Dad" side 8d of the family card, the opposite side being the "Mom" side as shown in FIGS. 5-7. The stick-on pocket 12 permits personalizing with a picture of Dad by inserting his picture 26 into the pocket via slot 10 as shown by Arrow I. It is thus framed by and covers the image area 1d.

Figure 11:
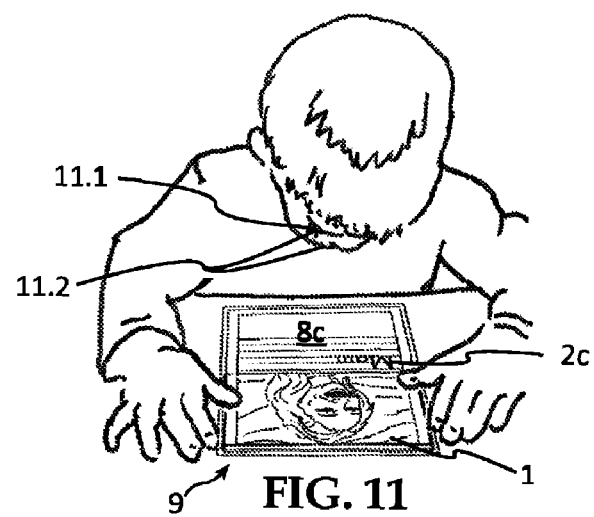
FIG. 11 is an isometric view of a young boy learner associating the picture and text of the card of FIG. 5.
Figure 12:
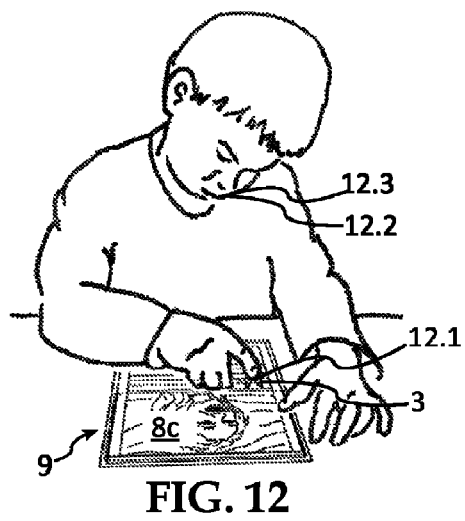
FIG. 12 is an isometric of the young boy learner of FIG. 11 finger tracing the textured indicia of the word of FIGS. 5 and 11 for the tactile, kinesthetic learning experience.
Figure 13:
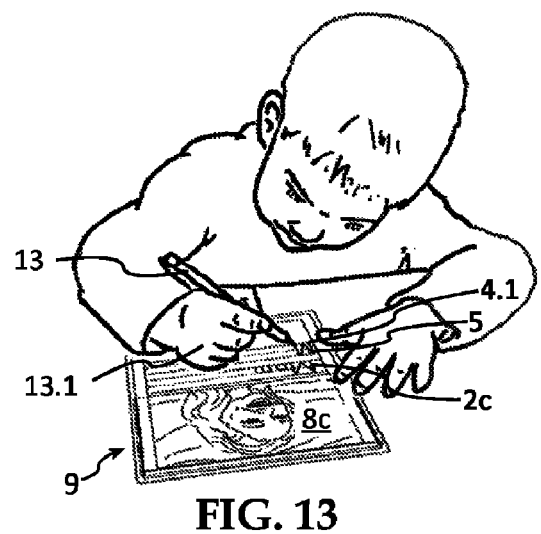
FIG. 13 is an isometric of the young boy learner of FIG. 11 writing with a marker on the second portion of the card, copying the text.
Figure 14:
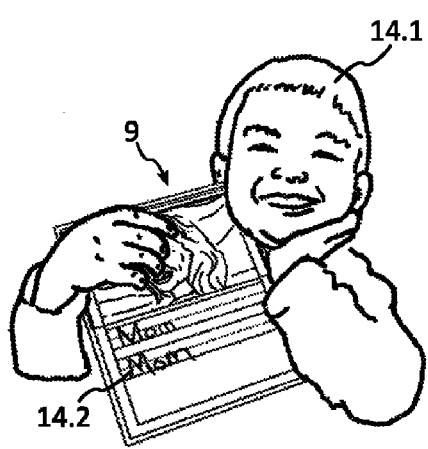
FIG. 14 is the young boy learner showing his progress and success in the associative learning tasks presented by the card.

FIGS. 11-15 are a series of photos illustrating aspects of the learning method of the invention. FIG. 11 is an isometric view of a young boy learner 11.1 viewing the card and verbalizing the word at 11.2 to associate the picture 1 and text 2c of the card 9 of FIG. 5. FIG. 12 is an isometric of the young boy learner of FIG. 11 finger tracing 12.1 the textured indicia 3 of the word "Mom" of FIGS. 5 and 11 for the tactile, kinesthetic learning experience, and also sounding out the word 12.2 while tracing, and again after finishing 12.3. FIG. 13 is an isometric of the young boy learner of FIG. 11 writing 13.1 with a marker 13 on the second portion 5 of the card 9, copying the text 2c. Note the card is large enough for the child to hold down while writing, so that it does not move as he writes. FIG. 14 is the young boy learner of FIG. 11 showing his progress and success 14.1 of writing 14.2 in the associative learning tasks presented by the card.

Figure 15:
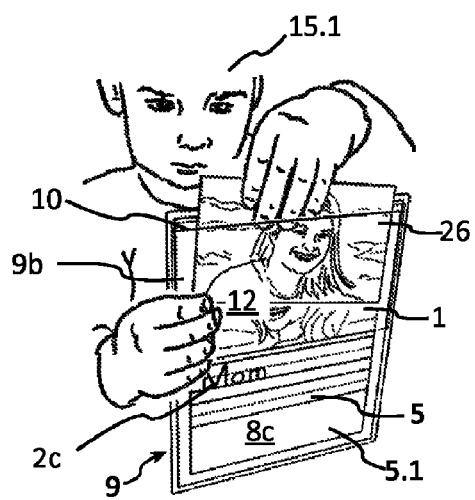
FIG. 15 is an isometric of a portrait format of the activity card of FIGS. 5 and 7, and showing the personalization feature of the invention by the child inserting a picture of his Mother in the "Mom" pocket through the edge slot.

FIG. 15 is an isometric of the personalizing activity by the learner 15.1, in which he is inserting a photo of his Mother 26 into the pouch via slot 10 of the activity card 9 of FIG. 5. This type of activity makes a strong neural association, assisting in the learning process.

Figure 16:
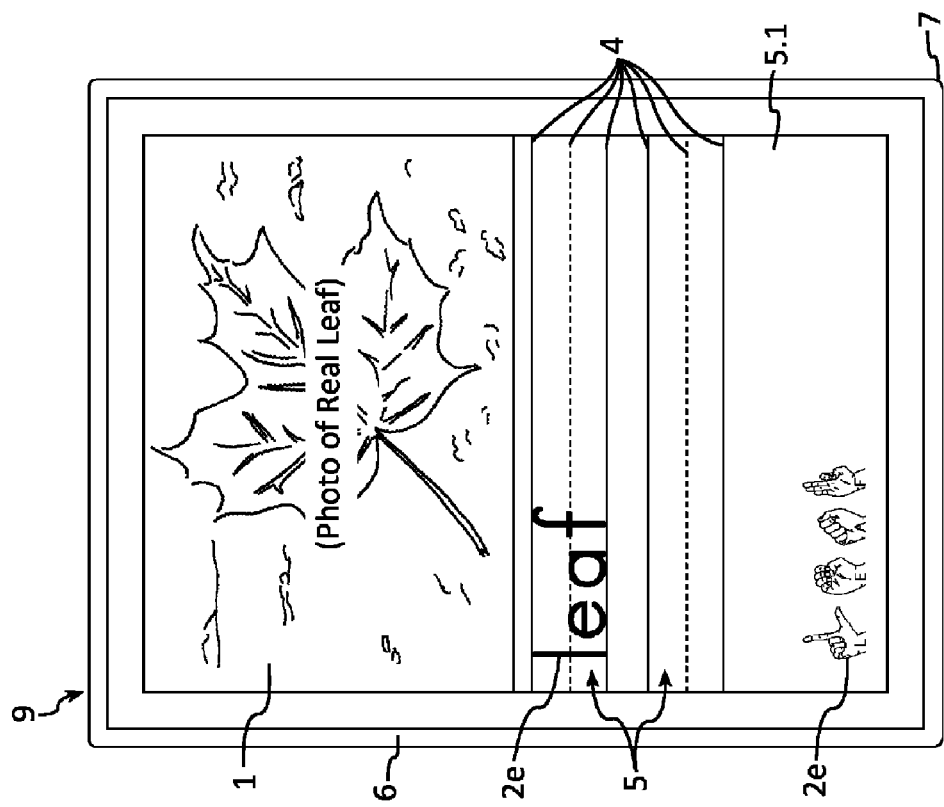
FIG. 16 is a plan view of the inventive card in which hand signing images, coded by the letters of the word and image illustrated on the card in the drawing area of the card.

FIGS. 16-19 show plan views of additional, alternate embodiments of the inventive learning card 9. In FIG. 16 the card includes a string of sign language indicia 2e, here the hand signs for the letters l, e, a and f. This shows visually the sequential forms for the hand to convey the word "leaf", and the presence of the text 2e in the writing area 5, along with the picture of a real leaf in image area 1, provides a substantial associative learning experience.

Figure 17:
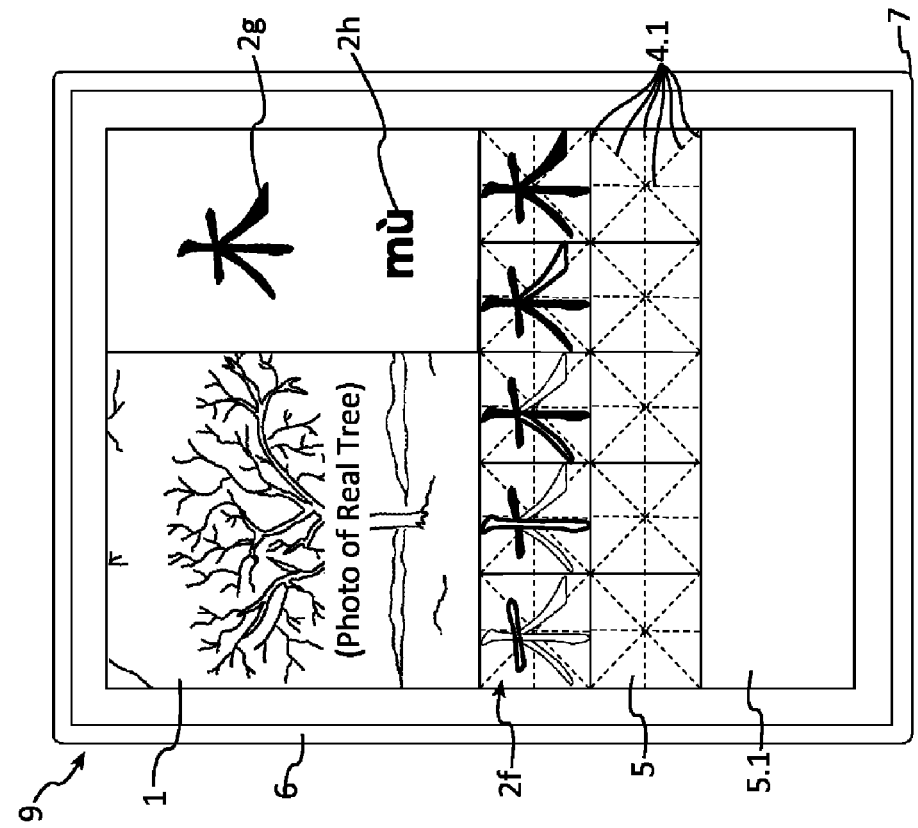
FIG. 17 is a plan view of the inventive card showing it adapted to teaching a non-English, ideographic, language.

FIG. 17 shows the application of the inventive card to a foreign language, here Simplified Chinese, as a first or second language. In addition, the progressive, cumulative stroke sequences in the five squares in the upper half of the writing area 5 illustrate the strokes 2f needed to form the ideograph "mu" (in Pinyin), 2g, representing a tree in image area 1. Note an outline of the stroke preceeds the stroke formation in the series of progressive stroke illustrations 2f in writing area 5. In addition, note the 8 radiating writing guidelines 4.1 assist the learner in the proper orientation of the respective strokes for the geometry of the orthography for that language. In the alternative, the word may be on the right, and the lines for writing practice to the left, or the writing area may be oriented vertically instead of horizontally.

Figure 18:
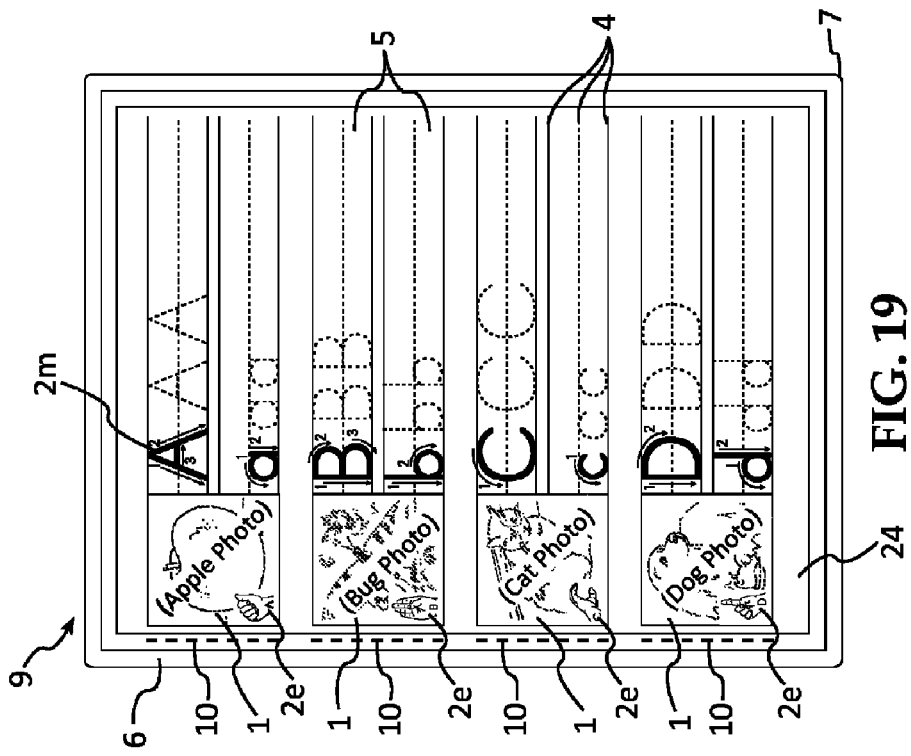
FIG. 18 is a plan view of the inventive card showing it adapted to a non-English, romance language, here Spanish, and also showing the inclusion of hand signing images.

FIG. 18 shows the application of the card 9 to a different foreign language, one of a series of cards 8e for Spanish language, this card presenting an image 1 and text 2j for the word "ojos" for eyes. In this example, the drawing area 5.1 also includes hand signs spelling out the letters o, j, o, s, and the letter j also illustrating hand motion with the little finger to form the "j" letter sign.

Figure 19:
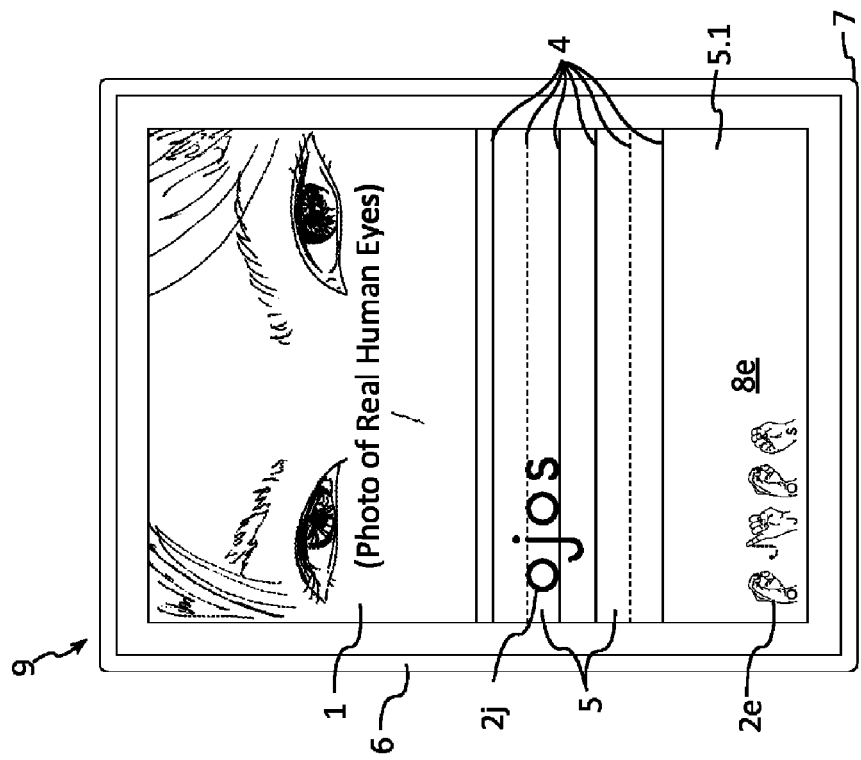
FIG. 19 is a plan view of another embodiment of the inventive card showing adaptation to use for learning the alphabet as a supplemental work sheet for children engaging in stroke practice, and having optional personalization pouches provided.

FIG. 19 shows a supplemental work sheet embodiment of the inventive card 9, in this case a plurality of combined image area and writing area strips in an array illustrating the first four letters of the alphabet, A-D, which are printed as indicia, 2m, in the writing area. In this embodiment, the image area 1 is formatted of the same size (transverse width) as the writing area pair of lines, and is approximately 20-25% the longitudinal length of the card. The writing lines 5, with letter height guidelines 4, lie to the right of the image. It should be understood that the image 1 could be to the right of the lines 5. In addition, inset in the image area is space 2e for line drawings of a hand signs representing the respective letters A, B, C and D. This card is a supplement for children doing letter formation stroke practice, and may be in landscape format. Optionally, a small stick-on or integral pouch may be placed associated with each image area, accessible via the slit 10 for personalization by the learner as described above with reference to FIG. 5.

Example of Method of Use of Inventive Card Learning Aid Device:

A 4-year old boy has learned in preschool that letters are associated with sounds and that letters when grouped together can form words. He has also had some experience writing individual letters. His parents teach him to bridge these prereading skills with reading and writing in his native language by use of the inventive cards, initially with a set that contains simple words that can be sounded out using traditional letter sounds. The texture on the cards interests him and the bold images and simple layout hold his attention. His parents demonstrate the inventive method on the first few cards, and then he is comfortable working through the card set independently. He is proud of his work and his parents hang the best cards on the refrigerator to display his success. After the cards have been displayed for a day, the boy removes them from the refrigerator, wipes them clean, and begins the process again.

Accordingly, the inventive educational, personalizable, multi-sensory learning aid for assisting child and adult learners having either text or visual learning styles in language and writing comprehension, is characterized as comprising: a) a generally planar rectangular paper sheet having marginal edges; b) disposed on said paper sheet inside said marginal edges are a series of printed borders defining: i) a first area on which is disposed a real object image; ii) a second area having a plurality of writing guidelined comprising solid lines defining margins within which writing is to be confined, and including dashed lines between said solid line margins defining orthographic element direction or size; and iii) a third area for free-hand drawing or printing by said learners; c) said second area includes letters or ideographs spelling the word for the object depicted in the first area, said word covering only a small portion of said second area, said word being disposed with respect to said solid and dashed guidelines to show the proper location for writing said word, and said second area including at least one full line between opposed side margins of said paper sheet for practice writing of said word by said learner; d) said first, image area is disposed above or to one side of the writing area, and the drawing area is disposed adjacent a bottom margin of said paper sheet; e) a first and a second smooth transparent rigid but flexible plastic sheet between which said paper sheet is laminated to form a robust, reusable, laminated card assembly, said plastic sheets being aligned congruent to each other, said paper sheet being smaller in area than said plastic sheets such that there is a clear marginal border around said paper sheet, and the corners of said laminated card assembly are rounded to prevent injury to children; f) the plastic of said plastic sheets is selected to permit writing and drawing with a marker and for easy erasing of the marker writing and drawing; and g) said laminated card learning aid is easily handled by children, may be cleaned and reused, is robust to provide extended useful life, and is universal with respect to both text and visual learning styles by providing, for predominantly text learners, sufficient space for either a left-handed or right-handed learner to engage in kinesthetic association by practice writing activity on the card without obscuring the text word or the image when practicing the letters on the second area guidelines, and for predominantly visual learners, providing a real object image that permits visual learning association with the word without double inductive reasoning being required.

In addition, the inventive universal, multi-sensory learning aid preferably includes a trans-parent pocket overlying substantially the extent of said image area, said pocket including a slot through which an image, personal to the learner may be inserted in the pocket so that said personal image is viewable by said learner in place of the original image provided laminated in the card.

With respect to a worksheet embodiment the inventive universal, multi-sensory learning card is adapted as a worksheet for alphabet practice by containing a plurality of individual image areas, each sized to the transverse width of a corresponding writing area (the short dimension of the writing area strip) and disposed combined with said writing area adjacent to one longitudinal end of said writing area, said plurality of combined image and writing areas extending in a strip across or down said paper sheet, each said image area containing a different real object image, the first letter of which is one of the letters of the alphabet which letter is imprinted adjacent the image area in said attached writing area, and said plurality of combined image and writing area strips are organized to present the alphabet indicia in the proper alphabetic sequence, said writing area being of sufficient extent to permit the learner to practice write each letter of the alphabet a plurality of times.

With respect to the method of use of the inventive learning aid flash-type cards to implement written and oral language skills in learners, principally children, use comprises the steps of: a) providing to a learner, a themed set of robust cards, each comprising a paper sheet laminated between transparent, rigid but flexible, writable plastic sheets, said paper sheet having imprinted thereon defined multiple, associated areas, including: i) a first area on which is disposed a real object image; ii) a second area having a plurality of writing guidelined comprising solid lines defining margins within which writing is to be confined, and including dashed lines between said solid line margins defining orthographic element direction or size; and iii) a third area for free-hand drawing or printing by said learners; iv) said second area includes printed letters or ideographs spelling the word for the object depicted in the first area, said word covering only a small portion of said second writing area, said word being disposed with respect to said solid and dashed guidelines to show the proper location for writing said word, and said second area extending in at least one full strip between opposed side margins of said paper sheet for practice writing of said word by said learner; v) said first, image area is disposed above or to one side of the writing area, and said drawing area is disposed adjacent a bottom margin of said paper sheet; b) permitting said learner to view said real object image and said printed word; c) assisting said learner to say the word representing said real object image; d) providing an erasable marker and guiding said learner to practice writing said word in said second area in proper relation to said guidelines; and e) permitting said learner to draw a picture or to write in said third area relating to said word and real object image, thereby to aid learning in a manner universal with respect to both text and visual learning styles by providing, for predominantly text learners, sufficient space for either a left-handed or right-handed learner to engage in kinesthetic association by practice writing or/and drawing activity on the card without obscuring the text word or the image when practicing the letters on the second, writing area guidelines and in the third, drawing area, and for predominantly visual learners, providing a real object image that permits visual learning association with the word without double inductive reasoning being required.

In addition the method of implementing written and oral language skills in children by use of the inventive flash-type cards provided to said learner includes a transparent pocket overlying substantially the extent of said image area, and which includes the step of guiding said learner to insert an image, personal to the learner into the pocket so that said personal image is viewable by said learner in place of the original image provided laminated in the card, thereby providing an activity that reinforces on a personal level the association between the image and the word.

INDUSTRIAL APPLICABILITY

It is clear that the inventive card set learning aid, particularly when associated with progressive workbooks, has wide applicability to the field and profession of education, and most particularly to young learners, or those learning a second or foreign language. The combined tactile, visual, aural and kinesthetic functionalities provide a universal learning aid card set that is responsive to the needs of all types, style and modes of learning, including text and visual learners.

It should be understood that various modifications within the scope of this invention can be made by one of ordinary skill in the art without departing from the spirit thereof and without undue experimentation. For example, the cards can have a wide range of shapes, including a cut-out along one margin to provide a carry handle, to provide the functionalities disclosed herein. A wide range of practice worksheets may be developed in the inventive card format for reinforcement of the associations learned. This invention is therefore to be defined by the scope of the appended claims as broadly as the prior art will permit, and in view of the specification if need be, including a full range of current and future equivalents thereof.

PARTS LIST

To assist examination; may be canceled upon allowance at option of Examiner.

| | |
|---|---|
| 1 | Image area |
| 1a | Image area for cat |
| 1b | Image area for dog |
| 1c | Image area for "Mom" |
| 1d | Image area for "Dad" |
| 2a | Indicia spelling the word "cat" |
| 2b | Indicia spelling the word "dog" |
| 2c | Indicia spelling the word "Mom" |
| 2d | Indicia spelling the word "Dad" |
| 2e | Sign language indicia |
| 2f | Indicia showing strokes to form the character for "tree" |
| 2g | Indicia showing the Chinese character for "tree" |
| 2h | Indicia showing pronunciation of foreign word |
| 2j | Indicia spelling the word "eyes" ("ojos") in Spanish |
| 2k | Indicia showing the Spanish word "ojos" in sign language |
| 2m | Indicia showing an individual letter |
| 3 | Optional texturing |
| 4 | Upper and lower case letter heights lines |
| 4.1 | Writing guidelines |
| 5 | Writing area |
| 5.1 | Drawing area |
| 6 | Clear margin |
| 7 | Rounded corners or rounded edge |
| 8a | "Cat" side of card |
| 8b | "Dog" side of card |
| 8c | "Mom" side of card |
| 8d | "Dad" side of family card |
| 8e | "Leaf" side of card |
| 8f | "Tree" side of card |
| 8g | "Eyes" side of card |
| 9 | Card |
| 9a | Inventive card - 1st embodiment |
| 9b | Plan view of personalizable activity card, embodiment #2 |
| 9c | Worksheet |
| 9d | Inventive card adapted to Chinese symbols |
| 10 | Edge slot |
| 10.1 | Adhesive pouch |
| 10.1a | Top adhesive pouch |
| 10.1b | Bottom adhesive pouch |
| 11.1 | Young boy viewing card |
| 11.2 | Learner viewing card, stating word |
| 12 | Pocket; 12a 1$^{st}$ side, 12b second side |
| 12.1 | Finger tracing |
| 12.2 | Word pronunciation |
| 13. | Marker |
| 13.1 | Learner copies text 2 onto guidelines 4 |
| 14.1 | Success response |
| 14.2 | Writing |
| 15.1 | Exemplary learner, a child |
| 20 | Bottom laminate sheet |
| 22 | Top laminate sheet |
| 24 | Printed sheet |
| 26 | Personal photo |
| 26a | Standard picture of "mom" |
| 26b | Standard picture of "dad" |
| 27 | Roller |
| 28 | Peel-off backing sheet for adhesive pocket |
| | Arrows P = Peel |
| | Arrows S = Stick on |

-continued

Arrows R = Roll
Arrows F = Force (pressure)
Arrows I = Insert

The invention claimed is:
1. A universal, multi-sensory learning aid for assisting child and adult learners having either text or visual learning styles in language and writing comprehension, comprising:
   a) a generally planar rectangular paper sheet having marginal edges;
   b) disposed on said paper sheet inside said marginal edges are a series of printed borders defining:
      i) a first area on which is disposed a real object image;
      ii) a second area having a plurality of writing guidelines comprising solid lines defining margins within which writing is to be confined, and including dashed lines between said solid line margins defining orthographic element direction or size; and
      iii) a third area for free-hand drawing or printing by said learners;
   c) said second area includes letters or ideographs spelling the word for the object depicted in the first area, said word covering only a small portion of said second area, said word being disposed with respect to said solid and dashed guidelines to show the proper location for writing said word, and said second area including at least one full line between opposed side margins of said paper sheet for practice writing of said word by said learner;
   d) said first, image area is disposed above or to one side of the writing area, and the drawing area is disposed adjacent a bottom margin of said paper sheet;
   e) said sheet being provided with a surface selected from at least one of a coating, and a first and a second smooth transparent rigid but flexible plastic sheet between which said paper sheet is laminated to form a robust, reusable, coated or laminated card assembly, and in the case of said laminated card assembly, said plastic sheets being aligned congruent to each other, said paper sheet being smaller in area than said plastic sheets such that there is a clear marginal border around said paper sheet, and the corners of said coated or laminated card assembly are rounded to prevent injury to children;
   f) said surface coating and said plastic of said plastic sheets is selected to permit writing and drawing with a marker and for easy erasing of the marker writing and drawing;
   g) a transparent pocket of sheet plastic overlying substantially the extent of said image area, said pocket including a slot for insertion of a separate image therethrough, so that when a separate image is inserted in said pocket through said slot, said separate image is viewable by said learner in place of the original image provided in the card, whereby said learner personalizes said learning aid by insertion of a separate image personal to the learner into said pocket via said slot; and
   h) said laminated card learning aid is easily handled by children, may be cleaned and reused, is robust to provide extended useful life, and is universal with respect to both text and visual learning styles by providing, for predominantly text learners, sufficient space for either a left-handed or right-handed learner to engage in kinesthetic association by practice writing activity on the card without obscuring the text word or the image when practicing the letters on the second area guidelines, and for predominantly visual learners, providing a real object image that permits visual learning association with the word without double inductive reasoning being required, and is personalizable by said learners.

2. A universal, multi-sensory learning aid as in claim 1 wherein a plurality of said robust cards are provided in a themed set.

3. A universal, multi-sensory learning aid as in claim 2 wherein said sheet as is presented in portrait-oriented format, with said first image area at the top, said second writing area below said image area, and said third drawing area below said second writing area.

4. A universal, multi-sensory learning aid as in claim 3 wherein said text letters include a tactile element in or forming the outlines of the text indicia, which element distinguishes the lines forming the letters of the text indicia from surrounding areas such that a tactile sensory experience reinforces the comprehension associations of the learner.

5. A universal, multi-sensory learning aid as in claim 1 wherein said third drawing area includes sign language indicia showing images of a hand for forming the letters of a hand corresponding to the text letters of the word in the second, writing area.

6. A universal, multi-sensory learning aid as in claim 1 wherein said text is selected from at least one of a first language or a second language of the learner.

7. A universal, multi-sensory learning aid as in claim 1 wherein the card is double-sided, said paper sheet containing a first, second and third area on each side, and the image and text are coordinated in meaning on each side, and different from each other.

8. A universal, multi-sensory learning aid as in claim 3 wherein the card is double-sided, said paper sheet contains a first, second and third area on each side, and the image and text are coordinated in meaning on each side, and different from each other.

9. A universal, multi-sensory learning aid as in claim 1 wherein at least one marginal border of plastic includes at least one aperture in the form of a punch hole or handle to serve as a means to store or carry said card.

10. A universal, multi-sensory learning aid as in claim 1 wherein said card is adapted as a worksheet for alphabet practice by containing a plurality of individual image areas, each sized to the transverse width of a corresponding writing area and disposed combined with said writing area adjacent to one longitudinal end of said writing area, said plurality of combined image and writing areas extending in a strip across or down said paper sheet, each said image area containing a different real object image, the first letter of which is one of the letters of the alphabet which letter is imprinted adjacent the image area in said attached writing area, and said plurality of combined image and writing area strips are organized to present the alphabet indicia in the proper alphabetic sequence, said writing area being of sufficient extent to permit the learner to practice write each letter of the alphabet a plurality of times.

11. A method of implementing written and oral language skills in learners, principally children, by use of flash type cards comprising the steps of:
   a) providing to a learner, a themed set of robust cards, each comprising a paper sheet coated or laminated between transparent, rigid but flexible, writable plastic sheets, said paper sheet having imprinted thereon defined multiple, associated areas, including:
      i) a first area on which is disposed a real object image;
      ii) a second area having a plurality of writing guidelines comprising solid lines defining margins within which writing is to be confined, and including dashed lines between said solid line margins defining orthographic element direction or size; and iii) a third area for free-hand drawing or printing by said learners;

iv) said second area includes printed letters or ideographs spelling the word for the object depicted in the first area, said word covering only a small portion of said second writing area, said word being disposed with respect to said solid and dashed guidelines to show the proper location for writing said word, and said second area extending in at least one full strip between opposed side margins of said paper sheet for practice writing of said word by said learner;

v) said first, image area is disposed above or to one side of the writing area, and said drawing area is disposed adjacent a bottom margin of said paper sheet;

b) permitting said learner to view said real object image and said printed word;

c) assisting said learner to say the word representing said real object image;

d) providing an erasable marker and guiding said learner to practice writing said word in said second area in proper relation to said guidelines; and e) permitting said learner to draw a picture or to write in said third area relating to said word and real object image, thereby to aid learning in a manner universal with respect to both text and visual learning styles by providing, for predominantly text learners, sufficient space for either a left-handed or right-handed learner to engage in kinesthetic association by practice writing or/and drawing activity on the card without obscuring the text word or the image when practicing the letters on the second, writing area guidelines and in the third, drawing area, and for predominantly visual learners, providing a real object image that permits visual learning association with the word without double inductive reasoning being required.

12. A method of implementing written and oral language skills in children as in claim 11 wherein a plurality of said robust cards are provided in a themed set and which includes repeating the steps with each of the cards in said set.

13. A method of implementing written and oral language skills in children as in claim 11 wherein said text letters include a tactile element in or forming the outlines of the text indicia, which element distinguishes the lines forming the letters of the text indicia from surrounding areas, and which includes the step of permitting the learner to finger trace the letters of the text to form a tactile sensory experience that reinforces the comprehension associations of the learner.

14. A method of implementing written and oral language skills in children as in claim 11 wherein said third drawing area includes sign language indicia showing images of a hand for forming the letters of a hand corresponding to the text letters of the word in the second, writing area, and which includes the step of guiding the learner to form the hand signs depicted in the sequence of the letters of the word shown in the second, writing area.

15. A method of implementing written and oral language skills in children as in claim 11 wherein said text represented in both a first language and a second language of the learner, and which includes the step of assisting said learner to verbally say both words and to write them.

16. A method of implementing written and oral language skills in children as in claim 11 wherein said card is double-sided, said paper sheet contains a first, second and third area on each side, and the image and text are coordinated in meaning on each side, and different from each other.

17. A method of implementing written and oral language skills in children as in claim 11 wherein said card provided to said learner includes a transparent sheet plastic pocket overlying substantially the extent of said image area, and which includes the step of guiding said learner to insert an image, personal to the learner into the pocket so that said personal image is viewable by said learner in place of the original image provided in the card, thereby providing an activity that reinforces on a personal level the association between the image and the word.

18. A method of implementing written and oral language skills in children as in claim 17 wherein said card provided to said learner includes a transparent pocket overlying substantially the extent of said image area, and which includes the step of guiding said learner to insert an image, personal to the learner into the pocket so that said personal image is viewable by said learner in place of the original image provided in the card, thereby providing an activity that reinforces on a personal level the association between the image and the word.

* * * * *